United States Patent
Dharmaji et al.

(10) Patent No.: US 8,214,273 B2
(45) Date of Patent: Jul. 3, 2012

(54) APPARATUS AND METHODS FOR ENABLING TARGETED INSERTION OF ADVERTISEMENTS USING METADATA AS IN-CONTENT DESCRIPTORS

(75) Inventors: Srinivasa Dharmaji, Cupertino, CA (US); Bharat Bhusan Biswal, Karnataka (IN)

(73) Assignee: Goldspot Media, Sunnyvale, CA (US)

( * ) Notice: Subject to any disclaimer, the term of this patent is extended or adjusted under 35 U.S.C. 154(b) by 541 days.

(21) Appl. No.: 12/191,103

(22) Filed: Aug. 13, 2008

(65) Prior Publication Data

US 2009/0083186 A1    Mar. 26, 2009

Related U.S. Application Data

(60) Provisional application No. 60/960,329, filed on Sep. 25, 2007.

(51) Int. Cl.
*G07G 1/14* (2006.01)
(52) U.S. Cl. .................. 705/35; 705/51; 705/74
(58) Field of Classification Search .................. None
See application file for complete search history.

(56) References Cited

U.S. PATENT DOCUMENTS

| | | | |
|---|---|---|---|
| 5,870,473 A * | 2/1999 | Boesch et al. | 705/78 |
| 5,983,207 A * | 11/1999 | Turk et al. | 705/39 |
| 6,463,585 B1 | 10/2002 | Hendricks et al. | |
| 6,701,528 B1 | 3/2004 | Arsenault et al. | |
| 6,950,623 B2 | 9/2005 | Brown et al. | |
| 6,959,143 B2 | 10/2005 | Dupuis et al. | |
| 6,971,119 B1 | 11/2005 | Arsenault et al. | |
| 7,168,084 B1 | 1/2007 | Hendricks et al. | |
| 7,231,651 B2 | 6/2007 | Pong | |
| 7,243,362 B2 | 7/2007 | Swix et al. | |
| 7,260,823 B2 | 8/2007 | Schlack et al. | |
| 7,668,316 B2 * | 2/2010 | Choi et al. | 380/277 |
| 2002/0004779 A1 * | 1/2002 | Turk et al. | 705/39 |
| 2002/0144263 A1 * | 10/2002 | Eldering et al. | 725/34 |
| 2004/0165724 A1 * | 8/2004 | Choi et al. | 380/45 |
| 2004/0189873 A1 * | 9/2004 | Konig et al. | 348/607 |
| 2006/0075449 A1 * | 4/2006 | Jagadeesan et al. | 725/113 |
| 2006/0117365 A1 | 6/2006 | Ueda et al. | |
| 2006/0140134 A1 * | 6/2006 | O'Brien et al. | 370/252 |
| 2006/0190358 A1 * | 8/2006 | Slik | 705/27 |
| 2006/0253330 A1 | 11/2006 | Maggio et al. | |
| 2006/0282319 A1 | 12/2006 | Maggio | |
| 2006/0287915 A1 * | 12/2006 | Boulet et al. | 705/14 |
| 2006/0293954 A1 | 12/2006 | Anderson et al. | |
| 2007/0053513 A1 | 3/2007 | Hoffberg | |
| 2007/0110226 A1 * | 5/2007 | Ogata | 380/28 |
| 2007/0244812 A1 * | 10/2007 | Turk et al. | 705/39 |
| 2009/0217318 A1 * | 8/2009 | Versteeg et al. | 725/32 |

* cited by examiner

*Primary Examiner* — Evens J Augustin
(74) *Attorney, Agent, or Firm* — Michael A. Glenn; Glenn Patent Group

(57) ABSTRACT

A mechanism for transmitting metadata that contain identifying characteristics of advertisements to be inserted, details of an advertisement-spot, and targeted viewing group details as in-content descriptors to a mobile handset is disclosed. Tight synchronization and control of the display of advertisements within an advertisement-spot during wireless content transmission is thus provided.

20 Claims, 3 Drawing Sheets

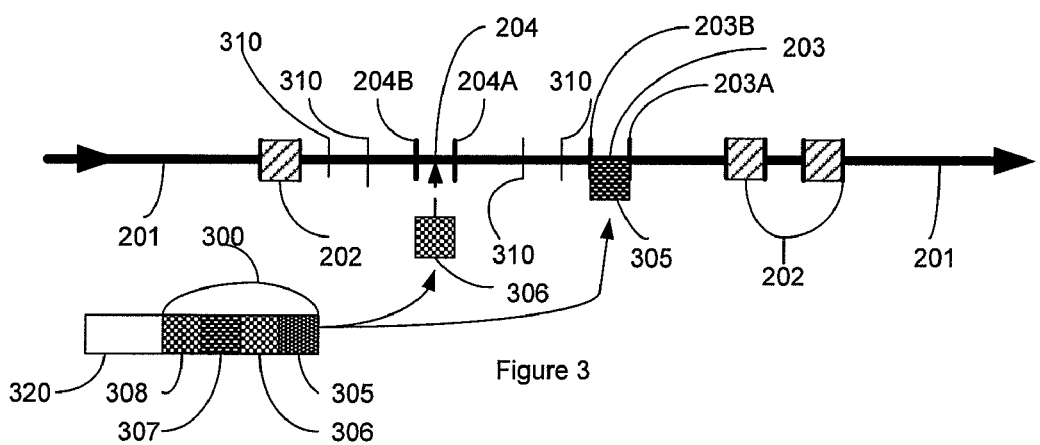

Figure 3

Table of main components of the Cue tone
Data structure

| Descriptor | ID | Description |
|---|---|---|
| Channel ID | CID | Identifies the channel being used |
| Program ID | PID | Identifies the program association |
| Ad Pod ID | AID | Identifies the ad group or pod. |
| Start time | t0 | time till start of ad insertion |
| End time | te | time till end of advertisement. |
| Ad list proirity | APL | priority list for ads in the pod |

Figure 4

APPARATUS AND METHODS FOR ENABLING TARGETED INSERTION OF ADVERTISEMENTS USING METADATA AS IN-CONTENT DESCRIPTORS

CROSS REFERENCE TO RELATED APPLICATIONS

This patent application claims the benefit of U.S. provisional patent application Ser. No. 60/960,329, Apparatus and Methods for Enabling Targeted Insertion of Advertisement Using Metadata Based In-Content Descriptors, filed Sep. 25, 2007, the entirety of which is hereby incorporated by this reference thereto.

BACKGROUND OF THE INVENTION

1. Technical Field

The invention relates generally to the field of advertising on mobile display terminals. More specifically, the invention relates to targeted advertisements delivered to mobile display terminals that are inserted into predefined advertisement spots.

2. Description of the Related Art

FIGS. 1 and 2 are examples of a prior art mobile transmission system. Major networks, e.g. NBC, ABC, etc. own, generate, and distribute content 120. The content is transmitted as a stream 201 along with advertisements to mobile network operators (MNOs) 103, who are also known as mobile broadcast operators (MBOs) and/or multi system operators (MSOs) 102. Typically the content 120 already contains ads included in advertisement-spots (ad-spots) 202. Some additional ad-spots 203 are left free within the content stream for addition of ads by the MNO 103.

The MSO 102 typically transmits to home televisions and other line-connected display systems 104, over cable and other fixed transmission links. The MNO 103 transmits to mobile display terminals 105 by performing A/V transcoding of data followed by compression over a wireless link. Typical mobile display terminals include, e.g. mobile handheld devices, cell phones, PDAs, and other wireless enabled display devices.

The Mobile Operator (MO) 106, e.g. Sprint®, Verizon®, Comcast® provides local transmission and coverage of mobile display terminals 105. The MO 106 has no relationship or connection with the content or ads that are transmitted and does not participate in the revenue generated by the ads in the content stream. The MO 106, in fact, owns and operates the software on the mobile display terminal 105 and guarantees the security of content and service with no revenue sharing. Since the MO 106 does not share in the ad revenue, there is no incentive to provide the software or capabilities to target focused ads on the mobile display terminal 105. The MO 106 might support targeted ad insertion software if the MO 106 shared in the ad revenue. However, currently there is no efficient method for inserting focused ads with tight synchronization and control into the selected free ad-spots in target mobile display terminals using the multicast wireless transmission.

FIG. 2 shows the ad-spots as they exist in a content stream 201 as supplied by major networks 101. Major networks 101 insert the ads 202 in their allocated ad-spots that, for example, are defined by the start at 202A and end at 202B during content 201 creation. During a multicast transmission, these ads are distributed to all the mobile display terminal 105 users. The MSO 102 inserts a separate set of ad-spots as shown between the time identifiers 203A and 203B and another set between 204A and 204B. These ads are also broadcast on a multicast network and transmitted to all mobile display terminal 105 users simultaneously.

It would be advantageous to insert focused ads for different target groups such that each group can view the ad that has been generated for them during content viewing. It would also be advantageous to provide focused ads to targeted groups of users of mobile display terminals.

SUMMARY OF THE INVENTION

In one embodiment, metadata is used as in-content descriptors for transmitting focused advertisements with tight synchronization to multiple target groups during viewing of content on mobile hand held platforms. In another embodiment, the invention works in tandem with the in-content descriptors to identify the relevant advertisement downloaded from the mobile operator server and inserts it in the advertisement spot in the content stream.

BRIEF DESCRIPTION OF THE DRAWINGS

FIG. 3 is an illustration of content flow with metadata based in-content descriptors enabling ad insertion according to one embodiment of the invention;

FIG. 4 is a table of main components of the cue tone data structure according to one embodiment of the invention;

DETAILED DESCRIPTION OF THE INVENTION

In one embodiment, the invention comprises a method and/or an apparatus for providing focused advertisement or alternate content to target specific individuals or groups. The focused advertisements are generated and inserted into the multimedia content stream at pre-defined advertisement spots, which results in different advertisements being shown at the same time to different target groups. Each advertisement is associated with metadata containing identifying characteristics of advertisements to be inserted, details of the advertisement-spot, targeted viewing group details, and in-content descriptors (descriptors). This helps to achieve tight synchronization and control of display of advertisements within an advertisement-spot during wireless content transmission.

In one embodiment, the invention is a system and a method for tightly controlling ad insertion into the available ad spot to achieve the desired result using metadata, typically encrypted using a double encryption scheme based on a public key encryption (PKK) that is transmitted with the content stream as cue-tones. The descriptors, decrypted where needed and processed to extract the metadata information, is used by a mobile display terminal, such as a mobile handset, cellular phone, personal digital assistant (PDA), e.g. to achieve tight synchronization during insertion of advertisements into the ad-spot.

To provide differing focused ads to different target groups simultaneously in a content multicast, it is necessary to first provide the ads that are generated for each target group for storage on the mobile display terminal 105 by that target group. The different focused ads, generated for each target group, are transferred to the user's mobile display terminal 105 using any available transmission means with identifying information. The identifying information enables the mobile display terminal 105 to selectively download and store the specific ads into its local memory. The insertion of advertisements within a downloaded list can be prioritized. The transfer and local storage of focused ads is done during the idle time or off line time by alternate transmission methods. This is possible as the mobile display terminal 105 is typically always connected to the net, whether in active use or not.

Co-pending application Targeted Advertisement Transmission and Delivery in a Bandwidth Limited Multicast Wireless System, filed Sep. 25, 2007, is assigned to a common assignee, the contents of which are herein incorporated in their entirety by this reference. This application covers the delivery and rendering details of the focused advertisements to the target groups.

Figure 1:
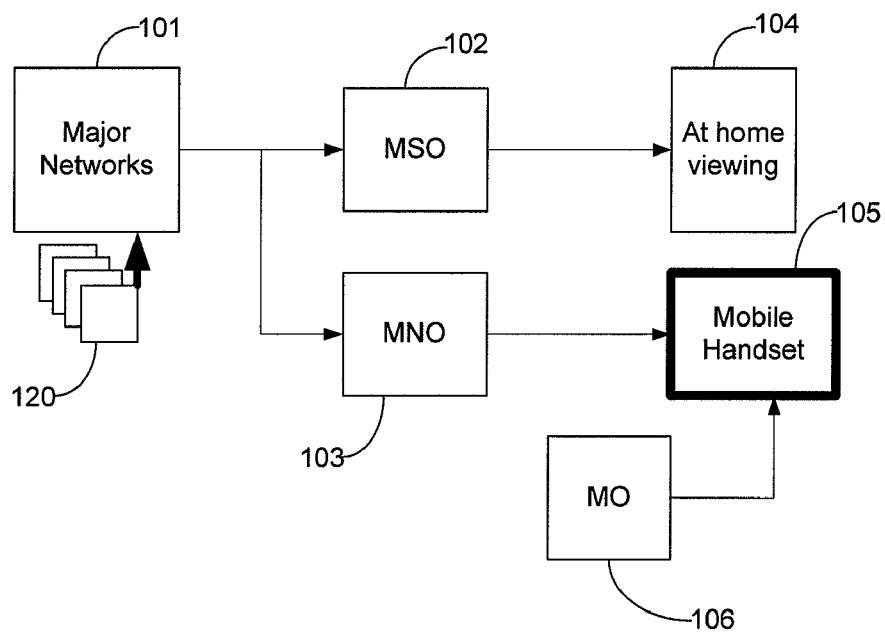
FIG. 1 is a block diagram that illustrates a transmit-receive system with both mobile and fixed transmissions.
Figure 2:
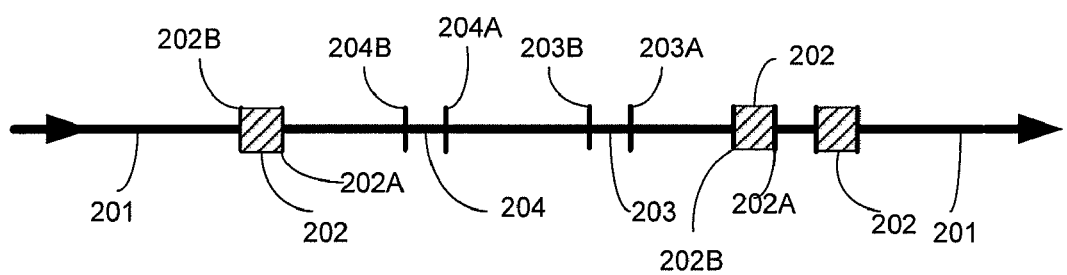
FIG. 2 is an illustration of a prior art content stream with ads inserted in the ad-spots by the major network who provides the content with filled ad-spots and free ad-spots for additional ads to be added by the MNO and MSO.
Figure 5:
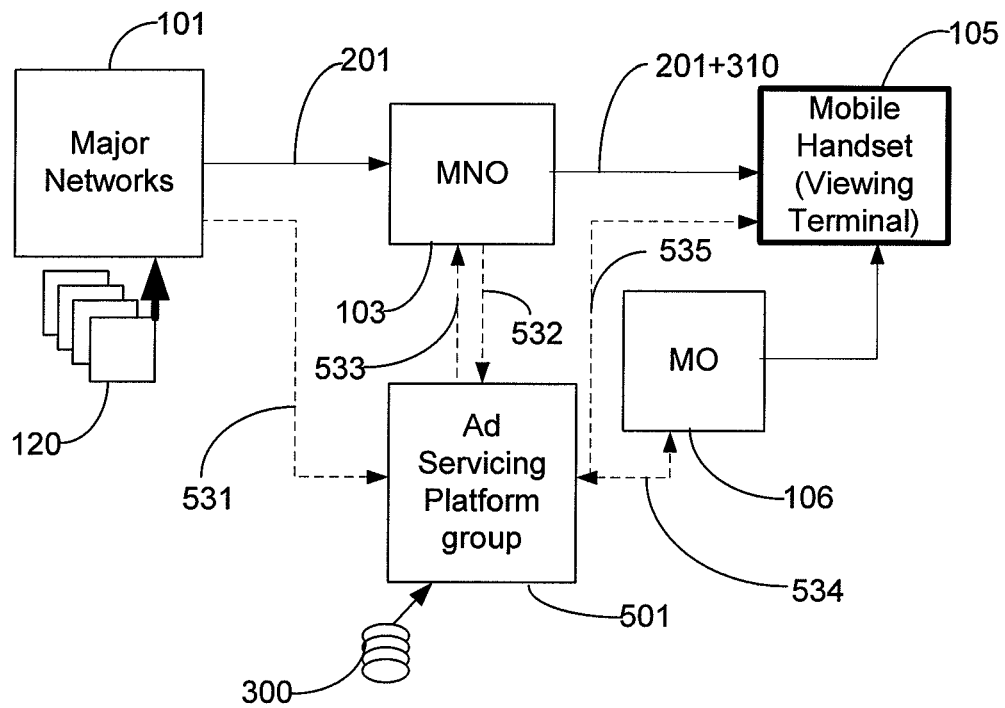
FIG. 5 is a block diagram that illustrates one embodiment of the invention, namely the servicing client and the display terminal client of the advertisement flow servicing platform.

FIG. 3 shows the rendering of the targeted ads 300, with individual ads 305 to 308 and FIG. 5 shows a typical non-limiting system for this. The ads 300 are downloaded and stored on a mobile display terminal 105 in the storage location 320 with the priorities identified with each ad 303 to 308. Additional information on the network channel, the ad spot identification, and target group information also aid in the download by the targeted mobile display terminal 105. This information is also useful in identifying the ad 305 to 308 for rendering during content display. The downloaded ads are stored on the mobile display terminal 105 in a memory storage location 320 with the identifying metadata.

In a typical multicast wireless transmission of content 201, the mobile display terminal 105 has multiple modes or capabilities for displaying the content 201. They include direct receive and display, and receive-store and display modes. In either of these modes the stored ads 300 cannot be displayed based on time alone. In the case of receive and display, the time delays between various mobile display terminals 105 depends upon path distance of the mobile display terminal 105 from the point of transmission.

In the case of store and forward, the user of the mobile display terminal 105 has the freedom to stop and start the viewing at will. Thus, timed insertion of advertisements does not align with the available ad spot and is disruptive to the content viewing. It is therefore necessary under both these conditions to have a means for prioritizing the locally stored ads 305 to 308 to render at the correct ad spots. For example, the ad 305 to be rendered at ad spot 203 defined between the start 203A and stop 203B, and ad 306 to be rendered at ad spot 204 defined between start 204A and stop 204B.

Ads are rendered at the correct ad spots by associating metadata based descriptors 310, typically in an encrypted form, with the content as shown in FIG. 3. These descriptors 310 are sent with the content at intervals to the mobile display terminal 105 prior to the time of ad spot. This enables the mobile display terminal 105 to identify the correct ad from the stored ads 300 and render the targeted ad at the right ad spot. It is the inclusion of the metadata that enable each mobile display terminal 105 to identify and insert the correct ad in the specified ad spot at the time of content viewing, using either direct receive and display, or receive-store and display mode.

The metadata (also known as cue tone) based information in the descriptors 310 includes at least the information contained in FIG. 4. The channel ID (CID) is used by the mobile display terminal 105 to identify the display channel. Program ID (PID) is used to identify the program viewed during which focused ad from 305 to 308 is to be displayed. The ad pod ID (AID) provides the information on ad group 300 from which the chosen ad one of 305 to 308 is to be rendered during viewing. It also contains ad priority list (APL) information that provides the updated priority, where required, for the ad display. The ad group 300 is specific to each target group and contains the ads 305 to 308 for only a specific target group. The start and stop information and the ad priority information are used for the rendering of the correct ad from the stored ads 300 at the correct ad spot 203 or 204. The input of the metadata based descriptors 310 prior to the ad spot 203 and 204 allows the mobile display terminal 105 to request and download the necessary ads 305 to 308 for rendering during a content 201 viewing if such content does not already exist in storage 320.

In a typical case the metadata sent to the mobile display terminal 105 can be encrypted using a two layer encryption scheme. The descriptors 310 are first encrypted and the key used to encrypt the metadata is encrypted again dynamically. A pre-provisioned master key, supplied to the mobile display terminal 105, is used to extract the keys used for the decryption of the descriptors 310. Once the second level key is extracted, it can be used to decrypt the descriptors 310 and retrieve the metadata.

Figure 6:
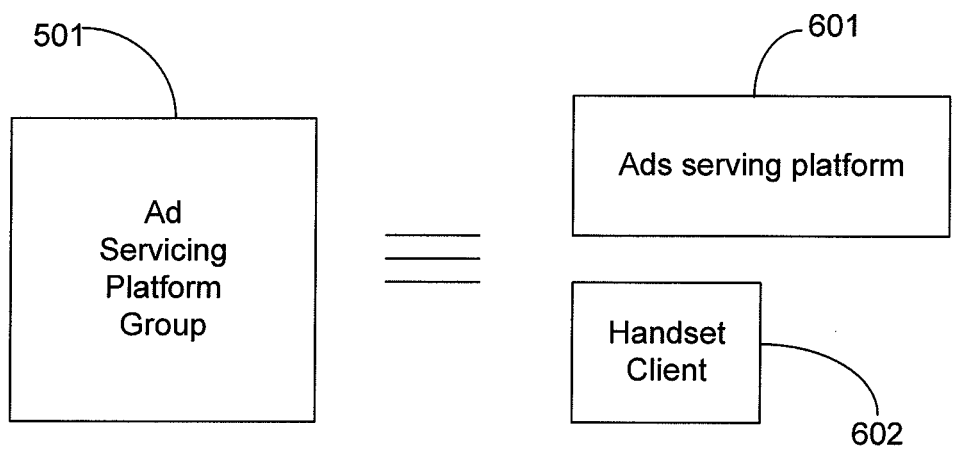
FIG. 6 is a flowchart that illustrates the generation of a targeted advertisement on a mobile display terminal according to one embodiment of the invention.

Referring to FIG. 6, the master key is provisioned by an ad-serving platform 601 at a base station and a handset client 602 on the mobile display terminal 105 through transfer using alternate paths during download of the ads. In one embodiment, the ad-serving platform 601 and the handset client 602 form part of the ad servicing platform group 501. Encryption improves the protection of the client base and reduces the unauthorized viewing of alternate content.

Metadata based descriptors provide tight synchronization between the rendering of the ads and the ad spots. The descriptors contain information regarding the ad spot, availability, and details as provided by the networks and the information on the trans-coding done by the MNOs 103. In addition, the metadata is compatible with software provided by the MOs 106 for the mobile display terminal 105 to enable the downloading and rendering of the ads as described. FIG. 5 illustrates one embodiment of the invention for delivering targeted ads.

The ad servicing platform group 501 controls the system. Its primary responsibility is to deliver and render focused ads 300 to the targeted groups with tight synchronization. This ad servicing platform group 501 has two sections, as shown in FIG. 6.

The ad serving platform (server) 610 enables the download transmission, scheduling, and over all policy management of the ad handling at a base station. The server 601 also manages all interactions with networks 101, MNO 103, and MO 106. The server 601 generates the metadata to be used as descriptors 310, encrypts the descriptors 310 by generating a key, which is transferred to the mobile display unit for decryption, and inserts the descriptors 310 into the content stream 201.

The handset client (client) 602 resides on the mobile display terminal 105. The client 602 identifies, downloads, and stores the correct focused ads and ad groups meant for the target group of the mobile display terminal, from the advertisements transmitted by the server 601. The client 602 identifies the encrypted descriptors 310 within the content stream 201 and handles the decryption of the descriptors 310 using the private key. The handset client 602 processes the metadata information extracted from the descriptors 310. This processed information is used to insert the correct ad from the locally stored ads or ad group on the mobile display terminal 105 at the appropriate ad spot for rendering during viewing of the content 201 by the user of the mobile display terminal 105.

The interaction can be further explained with reference to FIGS. 3, 5, and 6. The ad servicing platform group 510 shown in FIG. 5, comprises two subsystems, shown in FIG. 6: the server 601, which resides at the base station, and the client 602, which resides on the mobile display terminal 105. In FIG. 5, the content 120 is received directly by the networks 101. The network 101 generates the content 201 for broadcast to the MNO 103. The network also provides, through interaction link 531, the information and schema of the ad spots 203 and 204 that are available to the ad servicing platform group 501. The MNO 103 provides the trans-coding requirements, through link 532, to the ad servicing platform group 501. The server 602 transmits encoded and compressed descriptors 310 to the MNO 103 through link 532 for insertion during multicast broadcast of content 210. The ad servicing group 501 interacting with MO 106, through link 534, enables the download and installation of the client 602 on the mobile display terminal 105. The server 601 is now able to transmit for download the focused advertisements meant for multiple target groups simultaneously to the mobile display terminals 105.

The client 602 on each mobile display terminal 105 filters, downloads, and stores the specific ads 300 focused to the target group using the client 602 on a mobile display terminal 105 through link 535. The metadata are decrypted and the metadata contained therein is processed by the client 602 on the mobile display terminal 105. The information contained in the metadata is used to select the correct ad, one from the stored ads 300, stored locally in memory 320 on the mobile display terminal 105 for insertion into an ad spot. As an example, the ad 305 is inserted into the ad spot 204. The information contained in the metadata based descriptors 310 also enables the client to insert the chosen ad 305, with tight synchronization, into the ad spot 204 specified for it during content 201 viewing on the mobile display terminal 105.

Using this interconnected interaction scheme it is possible to use metadata based descriptors 310 to enable each of the ads 300 stored in local memory 320 on the mobile display terminal 105 to be inserted at the correct ad spot chosen for it. The use of metadata based descriptors 310 further enables the viewing of different focused ads, focused at different target groups, by those specific target groups simultaneously during viewing of the content 201.

Even though the use of the metadata based descriptors is disclosed for use with wireless and mobile platforms, there is nothing preventing such a scheme from being used in other applications and situations where different content needs to be provided to different individuals or groups simultaneously. Such applications are known to those of ordinary skill in the art and should not be viewed as departing from the spirit of the disclosed invention. The invention can be implemented in hardware, software, firmware or any combination thereof. The invention may further be contained in a computer product comprising computer readable medium that contains a plurality of instructions that when executed on a computer or a device capable of executing the instructions, results in the teachings of the invention herein.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer implemented method for displaying a targeted advertisement in a content stream during wireless content transmission on a wireless enabled mobile display terminal, the method comprising the steps of:
   generating a set of targeted advertisements;
   generating an associated in-content descriptor associated with each said targeted advertisement, said associated in-content descriptor containing instructions to said wireless enabled mobile display terminal for identifying, prioritizing, and inserting each said targeted advertisement at a specific ad spot in said content stream;
   transmitting said targeted advertisements and said associated in-content descriptors to said wireless enabled mobile display terminal;
   storing said targeted advertisements and said associated in-content descriptors on said wireless enabled mobile display terminal;
   receiving said content stream on said wireless enabled mobile display terminal;
   identifying an ad spot in said content stream;
   identifying a correct targeted advertisement with a correct priority to be inserted for display in said target spot by said wireless enabled mobile display terminal based on information contained in said associated in-content descriptor; and
   inserting and displaying said targeted advertisement at said specific ad spot in said content stream according to instructions contained in said associated in-content descriptor.

2. The method of claim 1, wherein said in-content descriptor comprises channel identification, program identification, ad pod identification, start time, end time, and ad list priority.

3. The method of claim 1, wherein said in-content descriptor is encrypted.

4. The method of claim 3, wherein said encryption comprises a private key.

5. The method of claim 1, wherein said targeted advertisement and said in-content descriptors are downloaded on to said wireless enabled mobile display terminal before said content stream.

6. The method of claim 1, wherein said in-content descriptors comprises instructions for prioritizing an order of insertion of a plurality of targeted advertisements.

7. The method of claim 1, further comprising the steps of:
   transmitting said content stream from a major network to a mobile network operator; and
   transmitting said content stream to an ad servicing platform group for generating said targeted advertisement and generating said in-content descriptor.

8. The method of claim 1, further comprising the step of identifying said targeted advertisement for insertion from a plurality of stored targeted advertisements stored on said wireless mobile display terminal.

9. The method of claim 1, further comprising the step of displaying said content stream containing said targeted advertisement on a display of said wireless enabled mobile display terminal.

10. An advertisement servicing platform group comprising:
- an advertisement serving platform for generating a targeted advertisement and an in-content descriptor associated with said targeted advertisement, said in-content descriptor comprising instructions for inserting said targeted advertisement into an ad spot in a content stream; and
- a handset client on a wireless enabled mobile display terminal for filtering, downloading, and storing said targeted advertisement and said in-content descriptor, on said wireless enabled mobile display terminal said handset client inserting said targeted advertisement into said content stream according to instructions in said in-content descriptor.

11. The advertisement servicing platform group of claim 10, wherein said advertisement serving platform generates an encrypted in-content descriptor and said handset client decrypts said encrypted in-content descriptor.

12. The advertisement servicing platform group of claim 10, wherein said in-content descriptor comprises channel identification, program identification, ad pod identification, start time, end time, and ad list priority.

13. The advertisement servicing platform group of claim 10, wherein said handset client is stored on a wireless enabled mobile display terminal.

14. The advertisement servicing platform group of claim 13, wherein said content is distributed to said wireless enabled mobile display terminal using a multicast network.

15. A wireless enabled mobile display terminal for displaying a targeted advertisement in a content stream, comprising:
- a handheld client for filtering said targeted advertisement and an in-content descriptor associated with said targeted advertisement from a plurality of advertisements;
- a computer-readable medium for storing said targeted advertisement and said in-content descriptor associated with said targeted advertisement;
- a processor for recognizing and processing said in-content descriptor to extract metadata contained in said in-content descriptor; and
- means for inserting said in-content descriptor into said content stream at an ad spot according to said metadata contained in said in-content descriptor.

16. The wireless enabled mobile display terminal of claim 15, wherein said targeted advertisement and said in-content descriptor and transmitted to said wireless enabled mobile display terminal on a multicast network.

17. The wireless enabled mobile display terminal of claim 15, wherein said targeted advertisement and said in-content descriptor are stored before said wireless enabled mobile display terminal receives said content.

18. The wireless enabled mobile display terminal of claim 15, further comprising a display for displaying said content stream containing said targeted advertisement.

19. The wireless enabled mobile display terminal of claim 15, wherein said targeted advertisement is inserted into said ad spot according to a priority contained in said in-content descriptor.

20. The wireless enabled mobile display terminal of claim 15, wherein said in-content descriptor is encrypted.

* * * * *